Figure 1:
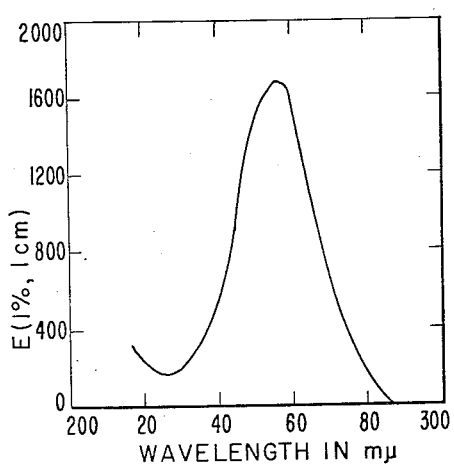

Sept. 10, 1957  F. C. STEWARD ET AL  2,806,027
COCONUT MILK EXTRACTS
Filed July 13, 1955  2 Sheets-Sheet 1

INVENTORS
FREDERICK C. STEWARD
EDGAR M. SHANTZ

BY C. Harold Herr
ATTORNEY

Sept. 10, 1957  F. C. STEWARD ET AL  2,806,027
COCONUT MILK EXTRACTS
Filed July 13, 1955  2 Sheets-Sheet 2

INVENTORS
FREDERICK C. STEWARD
EDGAR M. SHANTZ

BY
ATTORNEY

United States Patent Office 2,806,027
Patented Sept. 10, 1957

2,806,027

COCONUT MILK EXTRACTS

Frederick C. Steward and Edgar M. Shantz, Ithaca, N. Y.

Application July 13, 1955, Serial No. 521,860

5 Claims. (Cl. 260—236.5)

This invention relates to a process for obtaining crystalline substances capable of inciting in the presence of a basal medium and casein hydrolysate random cell division in plant tissues, and to the substances so obtained.

This application is a continuation-in-part of our co-pending application Serial No. 365,182, filed June 30, 1953 now abandoned.

More particularly, the invention is directed to a concentration process comprising the steps of diluting whole coconut milk with alcohol, treating the diluted milk with mercuric acetate, filtering the resulting precipitate, suspending the precipitate in water, treating the suspended precipitate with hydrogen sulfide, filtering off the precipitated sulfide, collecting and concentrating the filtrate to a heavy sludge and extracting the sludge with alcohol to yield an extract of growth-promoting substances.

When whole coconut milk is added to a basal medium containing mineral salts, sugars and vitamins it causes a striking increase in the growth by cell division of explants of certain tissues, notably carrot root phloem. Whole coconut milk produces an optimum growth response when added to the culture medium at a level of about 15% by volume, which represents a concentration of about 10,000 parts per million on a dry weight basis.

We have now found that by subjecting coconut milk to a series of extractive and fractionation steps in definite sequence recognizable chemical entities are obtained, which in a basal medium containing casein hydrolysate give a plant growth response equivalent to that given by the addition of whole coconut milk. The chemical entities obtained are also active at much lower concentrations.

The term "coconut milk" as used herein refers to the fluid endosperm that nourishes an immature embryo which later produces a spongy mass of cotyledonary tissue that eventually fills the central cavity of the seed. Coconut milk activity refers to the dramatic ability of this fluid to foster rapid and random division of otherwise mature cells of higher plants.

The initial enrichment of the coconut milk activity is made by reacting whole coconut milk with an excess of mercuric acetate after dilution by an equal volume of a lower aliphatic alcohol, preferably ethanol. After filtration, the resulting precipitate is suspended in water, treated with hydrogen sulfide and filtered to remove the precipitated sulfide. The filtrate is concentrated to a heavy sludge under reduced pressure or by any other conventional method.

The sludge is then extracted with a lower alcohol such as for example ethanol. The sludge is agitated during the extraction. The removal of the solvent leaves a dark heavy syrup equivalent to about 0.6% of the initial dry material of the coconut milk.

Such an extract as above described can be fractionated further by differential solubilities in any of a variety of solvents and by partition chromatography on cellulose. The methods by which the isolation of growth-promoting substances in coconut milk has been achieved are shown below in "flow sheet" form.

```
   700 gallons coconut milk (active at 10,000 p. p. m.)
         pH 5.0                   dry weight
                     │
                     ▼
   Diluted with equal vol. alcohol, Excess Hg acetate added
           │                    │
           ▼                    ▼
   Hg precipitate        Filtrate (inactive)
           │
           ▼
   Suspended in water
   treated with H₂S
           │          ╲
           ▼           ╲
   Precipitate      Filtrate
      HgS
                        │
                        ▼
          Solvent removed under reduced pressure
                        │
                        ▼
         22 lbs. thick dark sludge (active at 500 p. p. m.)
                        │
                        ▼
              Extracted with 85% ethanol
                 ╱          │
                ╱           │
          Residue        Extract, 4.3 lbs;
   (inactive at 1,000 p. p. m.)   (active at 50-250 p. p. m.)
```

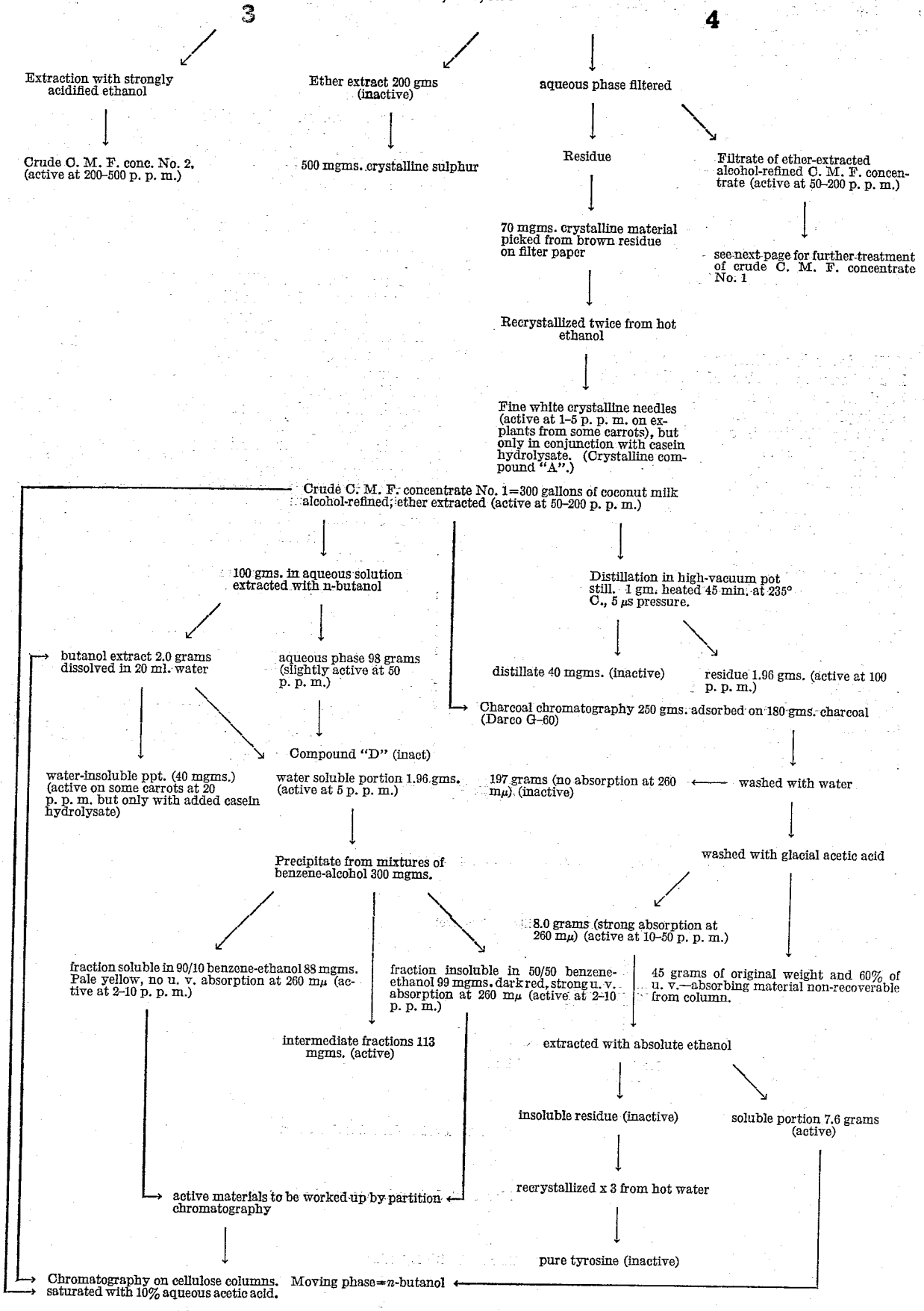

↓

In general, the activity appears distributed throughout fractions containing the first 50% of the eluted material. At least 2 or 3 zones of activity observed. Activity associated with strong ultra-violet absorption at 260 mμ except for that found in the earliest zone eluted from column. Activity appears not to be associated with zones which give a strong ninhydrin reaction.

↓

Crystalline Compounds "B" and "C" isolated.
Crystalline phenylalanine isolated (inactive).

Remainder of crude C. M. F. concentrate No. 1 equivalent to 350 gallons of coconut milk solvent-fractionated preliminary to chromatographic separation. Some degree of activity found in all fractions, roughly proportional to intensity of ultra-violet absorption.

Frac. 1. 14 gms. insol. 75% ethanol, u. v. extinct. coeff.=2.1 ⟶ Approx. 10 gms. of inorganic salts

↓

Frac. 2. 220 gms. insol. 90% ethanol, u. v. extinct. coeff.=5.9

↓

Frac. 3. 35 gms. insol. 95% ethanol, u. v. extinct. coeff.=7.35

↓

Frac. 4. 27 gms. insol. absol. ethanol, u. v. extinct. coeff.=10.0 ⟶ from 1.0 gm. of fraction 53 mg. pure alanine obtained (inactive)

↓

Frac. 5. 2.9 crude solid separating from cold absol. ethanol, u. v. extinct. coeff.=7.3 ⟶ 0.8 gm. crystalline pipecolic acid hydrochloride (inactive)

↓

Frac. 6. 25 gms. syrup separating from chilled absol. ethanol on longer storage. ⟶ from 2.0 gms. of fraction 110 mg. crude leucine obtained (inactive)
u. v. extinct. coeff.=14.9

↓

Frac. 7. 19 gms. insol. in 50/50 ethanol-acetone, u. v. extinct. coeff.=30.2 ⟶ 6.0 gms. chromatographed on cellulose

↓

Frac. 8. 33 gms. insol. in 10/90 ethanol-benzene, u. v. extinct. coeff.=6.0

↓

Frac. 9. 2.6 gms. soluble in benzene, u. v. extinct coeff.=21.5

Isolation of Compound "F"

Crude C. M. F. concentrate No. 1, passed thru steps designated Fractions 6 and 7 as shown above. Fractions 6 and 7 combined and, except for the 6 grams chromatographed as shown above the combined residue treated as follows:

↓

Mixed with cellulose powder and dried. Dry material packed in a large chromatography column.

↓

Washed with solvents in graded polarity series from ether, acetone, absolute alcohol, aqueous alcohol and ending with water. 90% alcohol added.

↓

90% ethanol eluate

↓

Chromatographed on Amberlite XE64 (a mild carboxylic acid resin), developed and washed with distilled water to remove some fractions. Bands of ultraviolet absorbing material, one of which was Compound "B," were removed.

↓

Washed with 0.1 N hydrochloric acid. First material was a fairly sharp band with strong ultraviolet band at 219 and 269 mμ in acid, at 224 and 280 mμ in base, and an extinction coefficient at 269 mμ in acid of 41.

↓

Rechromatographed twice more on XE64 in the manner described hereinbefore.

↓

Product with extinction coefficient at 269 mμ=162. Peak fractions taken, concentrated in aqueous acid, precipitated by absolute alcohol to give an extinction coefficient at 269 mμ equal to 193.

↓

Dissolved in hot water and cooled. A white non-crystalline powder appears and is collected. This powder is Compound "F". Extinction coefficient at 269 mμ=310.

It should be noted that the substances obtained from coconut milk by the processes of this invention, designated for convenience as Compounds "A," "B," "C" and "F," fail to produce at any concentration a total response which approaches that given by the addition of whole coconut milk.

To our surprise, we found that the full response could be restored by adding an enzymatic hydrolysate of casein (for which the coconut milk is a non-specific source) to the basal medium at a level of 500 p. p. m., and to a somewhat lesser extent by the addition of pure amino acid mixtures.

The addition of casein hydrolysate alone to the basal medium has but a relatively slight effect upon growth; a pronounced response is obtained only in combination with certain fractions from coconut milk.

Following our discovery of the effect of added casein hydrolysate, various fractions of the coconut milk concentrate have been examined to determine which ones, ineffective in themselves, are active when tested in the presence of casein hydrolysate. This has been done by measuring the growth of aseptic carrot tissue explants in an otherwise synthetic medium. From fractions which proved to be active in this assay procedure we have isolated four substances, referred to hereafter as Compounds A, B, C and F, which, when tested in the presence of casein hydrolysate, induce a rate of growth which approaches that obtained by the use of whole coconut milk. These substances discussed more fully hereafter in an individual fashion are all characterized by being ninhydrin inactive. It is believed that some of them contain their nitrogen in the pyridine nucleus.

*Compound A.—(1,3-diphenylurea)*

This crystalline substance was obtained directly upon evaporation of the alcohol extract described above. The alcohol-soluble portion of the mercury-freed precipitate from 800 gallons of coconut milk was reduced to three liters of aqueous solution. This was filtered to remove a small amount of insoluble residue. Upon drying the filter paper a number of small white crystals were observed and mechanically separated from extraneous material. The 78 mg. of crude crystals thus obtained were twice recrystallized from 2 ml. of hot absolute ethanol, giving a final yield of 56 mg. of fine white needles melting at 240.5° C. (uncor.).

Figure 2:
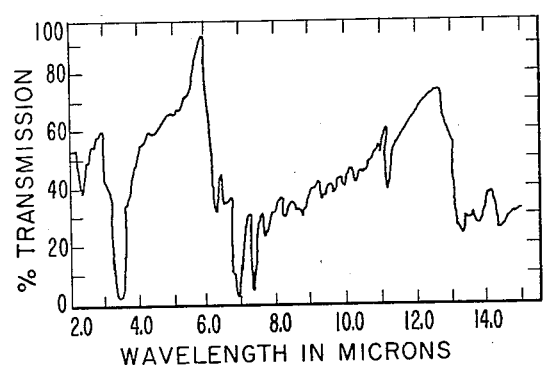

The maximum solubility of compound A in water at room temperature is about 40 mg. per liter. The ultraviolet absorption curve in absolute ethanol is shown in Figure 1. E (1%, 1 cm.) at the maximum (256 mμ)= 1710. The infrared absorption curve of compound A in a Nujol mull is shown in Figure 2. The strong absorption bands at 3.45 and 7.26 μ and part of the band at 6.90 μ are due to the Nujol. Compound A gives no color reaction with ninhydrin. Anal. C, 73.58; H, 5.78; N, 13.17; O, 7.63. Molecular weight as determined by isothermal distillation 173–230.

Figure 6:
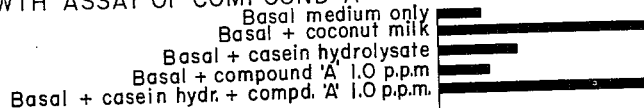
Figure 6:
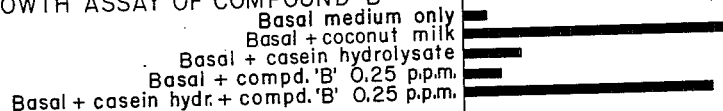
Figure 6:
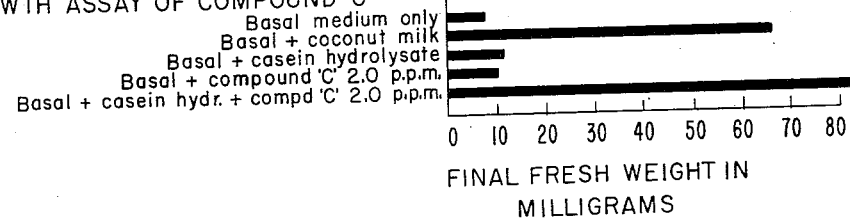

The growth response of Compound A as well as of Compounds B and C in the carrot issue bioassay test as described by S. M. Caplin and F. C. Steward in "Nature" 163, 920 (1949), is shown graphically in Figure 6. Each bar in Figure 6 represents the average weight of at least 3 carrot phloem explants after a 14-day test period. The original weight of each explant equals 2.6 mg. These tests were not done concurrently and therefore each of the three groups depicts the growth of the explant from a different carrot root.

TABLE 1

COMPOUND B BIOASSAY

|  | Final Average Fresh Weight, mg. | No. of Cultures |
|---|---|---|
| Basal | 4.1±0.4 | 4 |
| Basal+Coconut Milk | 53.1±12.2 | 4 |
| Basal+Casein Hydrolysate | 12.0±2.7 | 4 |
| Basal+Compound B, 0.25 p. p. m | 7.8±4.4 | 4 |
| Basal+Casein Hydrolysate+Compound B | 50.8±7.7 | 3 |

COMPOUND C BIOASSAY

| Basal | 7.7±1.0 | 4 |
|---|---|---|
| Basal+Coconut Milk | 65.1±9.5 | 4 |
| Basal+Casein Hydrolysate | 11.8±1.0 | 4 |
| Basal+Compound C, 2.0 p. p. m | 10.1±1.2 | 4 |
| Basal+Casein Hydrolysate+Compound C | 93.6±10.1 | 4 |

A portion of the original crude concentrate equivalent to about 200 gallons of the original coconut milk was further enriched by solvent fractionation to yield 2.8 g. of material active in the growth assay at 20 p. p. m. This concentrate was chromatographed in n-butanol-acetic acid-water mixture on a column containing 800 g. of finely powdered cellulose and was divided into 300 fractions of 25 ml. each. Each fraction was examined for its ultraviolet absorption, fluorescence under ultraviolet, and intensity of its reaction, if any, with ninhydrin.

About 50% of the material preceded the first strong ninhydrin-reaction region. Strong biological activity was found distributed throughout these early fractions, and further fractionation of material from this region indicates that there are several active substances, identifiable by differences in ultraviolet absorption or, in at least one instance, by an intense blue fluorescence.

From the fastest moving ninhydrin-reaction region crystalline phenylalanine was obtained and its identity established by paper chromatography. From a later region of fractions, showing both a strong ninhydrin test and ultraviolet absorption at 275 mμ, crystalline tyrosine was obtained. Between the phenylalanine and tyrosine regions there were fractions which absorbed strongly at 260–275 mμ but did not react with ninhydrin. From these fractions Compounds B and C were isolated.

*Compound B*

Crystalline Compound B was obtained from the fractions immediately preceding the tyrosine upon evaporating to a small volume. The crystals were filtered, collected, washed with alcohol, redissolved in water, and ultimately recrystallized from 0.3 ml. of absolute alcohol. One and two-tenth milligrams of small white needles were obtained after filtering, washing and drying. From the adjoining fractions an additional 0.7 mg. was obtained. This compound has a distinctive ultraviolet absorption curve with a pronounced shift between acid and alkaline solution.

Figure 3:
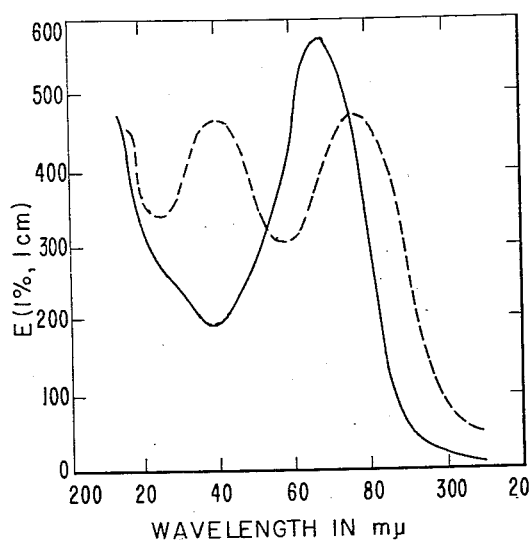

In Figure 3 there is shown the ultraviolet absorption curve of Compound B in 0.001 N HCl (solid line) and in 0.001 N NaOH solution (dotted line). The values of E (1%, 1 cm.) at the maxima are 568 at 267 mµ in acid solution, and 470 at 240 mµ and 475 at 277 mµ in alkaline solution.

Compound B exhibits absorption bands in the infrared region of the spectrum (determined in the solid state) at the following wavelengths and relative intensities:

| λ | Relative band intensity | λ | Relative band intensity |
|---|---|---|---|
| 2.92 | strong. | 7.53 | medium. |
| 3.18 | medium. | 7.64 | weak. |
| 3.22 | strong, broad. | 7.96 | Do. |
| 3.49 | Do. | 8.33 | medium. |
| 3.80 | medium, broad. | 8.70 | Do. |
| 4.90 | weak, broad. | 8.84 | Do. |
| 5.40 | very weak. | 9.82 | Do. |
| 5.58 | Do. | 10.40 | very weak. |
| 5.84 | very strong. | 10.52 | medium. |
| 6.35 | medium. | 11.78 | medium, broad. |
| 6.86 | weak. | 13.04 | medium. |
| 7.04 | medium. | 13.28 | Do. |
| 7.18 | very weak. | 14.20 | Do. |

Compound C

This crystalline substance has been obtained from the fractions immediately following phenylalanine in the cellulose column partition chromatography procedure. These fractions (210 mg.) were dissolved in 50 ml. of hot acetone, the volume reduced to 10 ml. and solution stored for a period of two days at −20° C. Clusters of prismatic white crystals were obtained which were filtered, washed with cold acetone, recrystallized twice from hot acetone, washed and dried to give a yield of about 20 mg.

When determining the melting point it was observed that the material sublimed at 200–210° C. and condensed in a crystalline state on the cool portions of the capillary. By ultraviolet and infrared absorption, the sublimed material was found to be apparently unchanged and its biological activity in the growth test also withstood this procedure.

Figure 4:
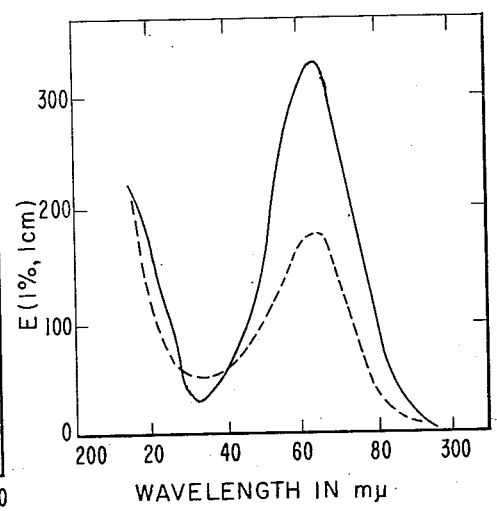

The ultraviolet absorption curve of Compound C in acid (0.001 N HCl-solid line) and alkaline solution (0.001 N NaOH) is shown in Figure 4. In alkaline solution the absorption maximum at 263 mµ is markedly depressed but unchanged in position. The values of E (1%, 1 cm.) at the maximum (263 mµ) are 326 in acid solution and 177 in alkaline solution; and at the minimum (232 mµ) the values of E are 31 in acid solution and 51 in alkaline solution.

Figure 5:
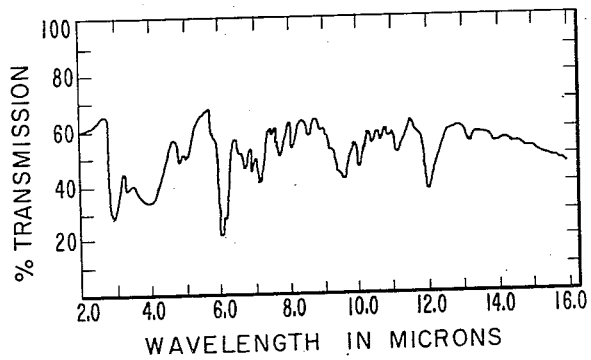

The infrared absorption spectrum of Compound C when dissolved in Nujol is shown in Figure 5. Wavelength values for the absorption bands and their relative intensities are as follows:

| λ | Relative band intensity | λ | Relative band intensity |
|---|---|---|---|
| 2.95 | strong. | 8.10 | medium. |
| 3.15 | medium. | 8.70 | Do. |
| 3.75 | medium, broad. | 8.95 | weak. |
| 4.10 | Do. | 9.05 | very weak. |
| 4.95 | medium. | 9.40 | medium. |
| 5.05 | Do. | 9.65 | Do. |
| 6.05 | strong. | 10.15 | Do. |
| 6.15 | medium. | 10.45 | weak. |
| 6.50 | weak. | 10.75 | Do. |
| 6.85 | medium. | 10.95 | Do. |
| 6.95 | weak. | 11.05 | medium. |
| 7.15 | medium. | 12.02 | strong. |
| 7.65 | very weak. | 13.10 | medium. |
| 7.90 | medium. | 13.95 | weak. |

An analysis showed C, 56.42; H, 8.11; N, 7.67. The growth promoting power of this substance in the carrot phloem explant tissue culture test is shown in Figure 6.

Compound F

This powdery substance has been obtained by the cellulose column partition chromatography procedure outlined above. It is active in the carrot assay in a manner similar to Compounds A, B and C. The compound has a distinctive ultraviolet absorption curve. The value of E (1%, 1 cm.) at the maxima are 310 at 269 mµ and 1540 at 219 mµ in acid solution; and 280 at 280 mµ and 1360 at 224 mµ in alkaline solution.

Compound F exhibits absorption bands in the infrared region of the spectrum (determined in the solid state using the KBr disc technique) at the following wavelengths and relative intensities:

| λ | Relative band intensity | λ | Relative band intensity |
|---|---|---|---|
| 2.94 | strong. | 8.58 | very weak. |
| 3.18 | Do. | 8.65 | weak. |
| 3.62 | weak. | 8.73 | Do. |
| 3.80 | very weak. | 8.99 | Do. |
| 4.07 | Do. | 9.30 | medium, broad. |
| 6.11 | very strong. | 9.86 | Do. |
| 6.72 | very weak. | 10.06 | weak. |
| 6.78 | Do. | 10.52 | weak, broad. |
| 6.88 | medium. | 11.19 | Do. |
| 7.13 | strong. | 11.78 | Do. |
| 7.28 | weak. | 12.05 | weak. |
| 7.33 | medium. | 12.24 | medium. |
| 7.92 | Do. | 13.60 | strong. |
| 8.18 | Do. | 14.04 | weak. |
| 8.30 | very weak. | | |

Compound F has been found to have growth-promoting activity on carrot explants from certain stocks.

These novel growth-promoting substances particularly when used in combination with casein hydrolysate are of use as synergists for 2,4-D in herbicidal compositions as described and claimed in the copending United States application of Frederick C. Steward and Samuel M. Caplin, Serial No. 473,006, December 3, 1954, which is a continuation-in-part of Serial No. 285,411, filed May 1, 1952, now abandoned.

The compounds of our invention are also useful when admixed with a nutrient medium containing certain plant extracts to inhibit the growth of plant tissues as fully described and claimed in the copending United States applications of Frederick C. Steward and Samuel M. Caplin, Serial Nos. 473,007 and 473,008, filed December 3, 1954, both of which are continuations-in-part of Serial No. 285,412, filed May 1, 1952, now abandoned.

We claim:

1. In a process for obtaining from coconut milk chemical substances capable of fostering in the presence of a basal medium containing casein hydrolysate rapid and random division of cells of higher plants, the steps which comprise diluting whole coconut milk with alcohol, treating the alcoholic solution with an excess of mercuric acetate, filtering the reaction mixture, collecting the resulting precipitate, suspending the precipitate in water, treating said precipitate with hydrogen sulfide, filtering off the precipitated sulfide, concentrating the filtrate to a heavy sludge, and extracting said sludge with an alcohol.

2. In a process for obtaining from coconut milk chemical substances capable of fostering in the presence of a basal medium containing casein hydrolysate rapid and random division of cells of higher plants, the steps which comprise mixing coconut milk at about pH 5.0 with an equal volume of ethanol and an excess of mercuric acetate, filtering the mixture, suspending in water the precipitate obtained upon filtration, treating the suspended precipitate with hydrogen sulfide, removing the precipitated sulfide by filtration, collecting the filtrate, concentrating the filtrate to a sludge under reduced pressure and extracting the sludge by agitation with 90% ethanol.

3. In a process for obtaining from coconut milk chemical substances capable of fostering in the presence of a basal medium containing casein hydrolysate rapid and random division of cells of higher plants, the steps which comprise mixing coconut milk at about pH 5.0 with an equal volume of ethanol and an excess of mercuric acetate, filtering the mixture, suspending in water the precipitate obtained upon filtration, treating the suspended precipitate with hydrogen sulfide, removing the precipitated sulfide by filtration, collecting the filtrate, concentrating the filtrate to a sludge under reduced pressure, extracting the sludge by agitation with 90% ethanol, removing at least a portion of the ethanol and fractionating the resulting extract by partition chromatography on cellulose.

4. In the process of claim 3, the step of fractionating the product by partition chromatography on cellulose being effected in the presence of n-butyl alcohol saturated with 2M acetic acid.

5. A chemical compound capable of fostering rapid and random division of mature cells of higher plants when present in a basal medium containing casein hydrolysate and obtained from coconut milk according to the process steps of claim 1; said chemical compound being selected from the group consisting of Compounds B, C and F; said Compound B being slightly soluble in alcohol and having ultraviolet absorption spectrum maxima at 267 m$\mu$ in acid solution, E (1%, 1 cm.)=568, and at 240 m$\mu$ and 277 m$\mu$ in alkaline solution, E (1%, 1 cm.)=470, and 475; and an infrared spectrum showing strong bands at the following wavelengths expressed in microns: 2.92, 3.22 (broad), 3.49 (broad), and 5.84; and said Compound C being soluble in hot acetone but insoluble in cold acetone, and having ultraviolet absorption spectrum at 263 m$\mu$ in acid, E (1%, 1 cm.)=326, and in alkaline solution, E (1%, 1 cm.)=177, exhibiting strong bands in an infrared absorption spectrum at the following wavelengths expressed in microns: 2.95, 6.05, and 12.02, and being further characterized by subliming unchanged at 200–210° C. said Compound F having ultraviolet absorption spectra maxima at 269 m$\mu$ and 219 m$\mu$ in acid, E (1%, 1 cm.)=310 and 219; and at 280 m$\mu$ and 224 m$\mu$ in alkaline solution, E (1%, 1 cm.)=280 and 1360, and an infrared spectrum showing strong bands at the following wavelengths expressed in microns: 2.94, 3.18, 6.11, 7.13, and 13.60.

No references cited.